Sept. 3, 1968   NOBUHISA IKEDA   3,399,735
CONTINUOUSLY FEEDING AND ROTATING DEVICE
FOR BORE DRILLING RODS
Filed March 14, 1967   3 Sheets-Sheet 1

United States Patent Office 3,399,735
Patented Sept. 3, 1968

3,399,735
CONTINUOUSLY FEEDING AND ROTATING DEVICE FOR BORE DRILLING RODS
Nobuhisa Ikeda, Tokyo-to, Japan, assignor to Kabushiki Kaisha Tone Boring, Tokyo-to, Japan
Filed Mar. 14, 1967, Ser. No. 622,978
7 Claims. (Cl. 173—149)

ABSTRACT OF THE DISCLOSURE

The drilling rod of a bore drilling machine is continuously fed in its axial direction with rotation by two rotating chucks alternately grasping the drilling rod so that it is continually supported, at least one of the chucks undergoing reciprocation with rotation, and the operations of the chucks are alternated by a differential gear mechanism which is controlled interrelatedly with the reciprocation of at least one of the chucks. Examples of mechanical and hydraulic driving mechanisms for producing this reciprocation are given.

---

This invention relates to bore drilling machines and more particularly to a new and improved device, in a bore drilling machine, for continuously feeding a bore drilling rod as the drilling rod is rotated, the device being capable of accomplishing this continuous feeding in a very simple and smooth manner.

In bore drilling rod feeding mechanisms known heretofore in bore drilling machines, there are provided in each case a spindle rotationally driven by a motive power source and having a hollow interior through which a bore drilling rod is passed and a chuck capable of rotating together with this spindle, the spindle being fed downward as the chuck grasps the bore drilling rod and causes it to rotate, thereby causing the drilling rod to undergo simultaneously a rotation and a downward axial feeding movement.

However, since the axial stroke of the spindle cannot continue beyond a certain limit, the common operational procedure is to cause the chuck to release the rod at the end of a specified stroke, to return the spindle to its original upper position, to cause the chuck to grasp the rod again, and to repeat the above described operation of feeding the rod as it is rotated. In this manner, the operational cycle is repeated.

At every cycle of the above described operation, that is, at the beginning of each return of the spindle, it is necessary to stop the rotation of the spindle and to disengage the chuck from the bore drilling rod. During this procedure, however, since there is the possibility of occurrences such as damage to the bit at the bore bottom because of the weight of the drilling rod itself and other factors, it is necessary to provide separately devices such as a rod holder for holding the rod in suspension each time the chuck is disengaged in the above described manner.

Accordingly, a principal object of the present invention is to provide a device for continuous feeding of the bore drilling rod of a bore drilling machine which device is capable of accomplishing chuck release in a continuous and smooth manner without the above described disadvantage of conventional devices, that is, the necessity of stopping the spindle rotation each time the chuck is disengaged.

Another object of the invention is to provide a device of the above stated character in which the spindle stroke is short, whereby the entire device can be substantially reduced in size.

According to the present invention, briefly summarized, there is provided, in a bore drilling machine of the type in which a drilling rod is fed with rotation by a reciprocating and rotating chuck alternately grasping and releasing successive parts of the rod, a device for continuously feeding the drilling rod with rotation, which device is characterized by two rotating chuck devices which alternately grasp the drilling rod so that the rod is never in an ungrasped state, at least one of the chuck devices repeating the operation of grasping the rod, feeding the rod axially with rotation, releasing the rod, and returning to the original position, and by a differential gear mechanism for changing over the alternate operations of the two chuck devices.

The manner in which the foregoing objects, other objects, and characteristic features have been achieved by the invention will be more clearly apparent from the following detailed description with respect to preferred embodiments of the invention when read in conjunction with the accompanying drawing, in which like parts are designated by like reference numerals and characters.

Figure 1:
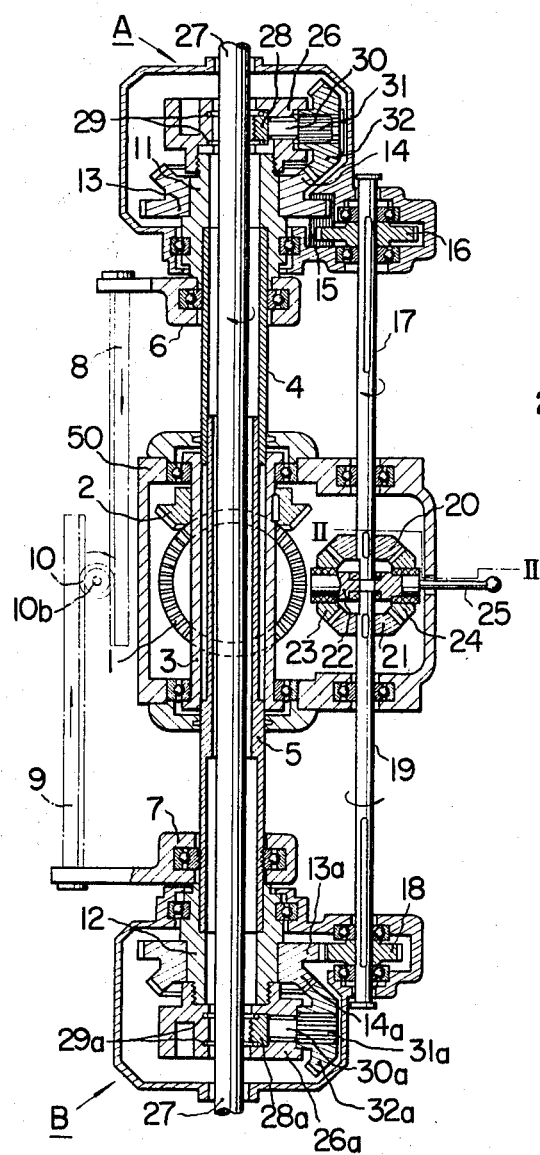
FIG. 1 is an elevational view, in vertical section, showing the essential parts of one example of a drilling rod feeding device embodying the invention.
Figure 2:
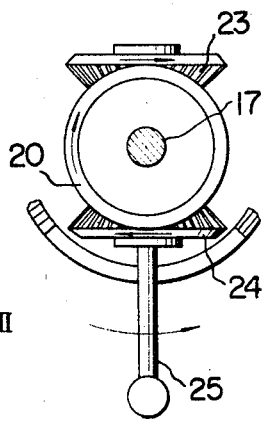
FIG. 2 is a sectional view taken along the line II—II shown in FIG. 1.

Referring to FIGS. 1 and 2, the example shown therein of the rod feeding device according to the invention has two hollow spindles 4 and 5 rotationally driven by an electric motor or some other rotational drive prime mover (not shown) through a bevel gear 1 driven by the prime mover, an annular bevel gear 2 driven by the bevel gear 1, and a driving hollow shaft 3 coupled to and rotating with the bevel gear 2. The structure 50 supporting and housing the bevel gears 1 and 2, the hollow shaft 3, and another gear mechanism to be described hereinafter is secured to the frame (not shown) of the bore drilling machine.

The spindles 4 and 5 are fitted concentrically within the hollow shaft 3 with a telescoped relationship and are provided with means (for example, splines or sliding keys) whereby the spindles can undergo relative movement in the axial direction of the hollow shaft 3 but cannot undergo relative rotational movement. Thus, the spindles 4 and 5 are rotationally driven together by the hollow shaft 3 while being movable in the axial direction.

The spindles 4 and 5 are rotatably supported at parts near their upper and lower ends, respectively, by support structures 6 and 7, to which vertically disposed rack members 8 and 9 are respectively fixed. These rack members 8 and 9 are meshed with a common gear 10, fixed to a rotatable shaft 10b, on opposite sides of the gear 10, whereby a rotation of the gear 10 causes the rack members 8 and 9 (and, therefore, the support structures) to move in opposite vertical directions.

Rotating heads 11 and 12 are fixed to the outer or upper and lower ends, respectively, of the spindles 4 and 5. A spur gear 13 and a bevel gear 14 integrally formed therewith are fitted around the outer periphery of the rotating head 11, and similar spur and bevel gears 13a and 14a are similarly fitted around the outer periphery of the rotating head 12.

The spur gear 13 is coupled by way of an idler gear 15 to a gear 16 which is fitted around a vertical shaft 17 in a manner to permit axial movement relative to each other but to prevent relative rotation therebetween. The spur gear 13a is meshed directly with a gear 18 which is similarly fitted around a vertical shaft 19 in a manner to permit axial movement relative to each other but to prevent relative rotation therebetween.

Parts near the inner or the lower and upper ends, respectively, of the vertical shafts 17 and 19 support bevel gears 20 and 21 fixed thereto. The extreme lower and upper ends of the shafts 17 and 19 are received and held by an intermediate bearing member 22, the ends of which support bevel gears 23 and 24 each meshing with bevel gears 20 and 21. The end of the bearing member on the side of the bevel gear 24 extends outward in the form of a lever handle 25.

The aforementioned rotating heads 11 and 12 support rotating members 26 and 26a respectively fixed to the outer ends thereof. On the inner sides of these members 26 and 26a, there are inserted chucks 28 and 28a capable of grasping and holding a bore drilling rod 27. The chuck 28, movable jaw member, is opened toward the release direction by a snap ring 29 and pressed toward the grasp direction by a chuck screw one part 30 of which is in screw thread engagement with the rotating member 26. The rear end of the chuck screw is in the form of a splined shaft with splines 31 engaged slidingly with a bevel gear 32 which is meshed with the aforementioned bevel gear 14, whereby the shaft part 30 rotates together with the bevel gear 32 but can move axially relative thereto.

Accordingly, depending on the direction of rotation of the bevel gear 32, the movable jaw of the chuck is caused to advance and grasp the bore drilling rod 27 or to retract away from the rod 27. The lower chuck 28a and its related parts 30a, 31a, and 32a corresponding respectively to parts 30, 31, and 32 are constructed and arranged in the same manner.

The drilling rod feeding device according to the invention as described above and as illustrated in FIGS. 1 and 2 operates in the following manner.

When, with the device in the state indicated in FIG. 1 wherein the upper chuck 28 is grasping and holding the bore drilling rod 27, and the lower chuck 28a is disengaged from the rod 27, the bevel gears 1 and 2 are driven, the rotational power is transmitted successively through the bevel gear 2, the driving hollow shaft 3 coupled thereto, the spindle 4 coupled rotationally to the hollow shaft 3, the rotating head 11, the rotating member 26, and the chuck 28, whereby the drilling rod 27 held by the chuck 28 is rotated.

When the gear 10 is simultaneously rotated in the arrow direction, the rack member 8 descends, and, consequently, the support structure 6, the spindle 4, and the chuck and gear assembly A above the support member 6 descend. During this operation, the vertical shaft 17 retains its position and undergoes only rotation, while the gear 16 rotationally driving the shaft 17 slides axially downward relative thereto.

On the other hand, the rack member 9, simultaneously with the descent of the rack member 8, ascends through the same distance, and, consequently, the lower support member 7, the spindle 5, and the chuck and gear assembly B below the support member 8 also ascend. During this operation, the vertical shaft 19 also retains its position and undergoes only rotation, while the gear 18 slides axially upward relative thereto.

During this operation, the gears 13 and 13a, gears 16 and 18, and bevel gears 20, 21, 22, 23, and 24 merely rotate and accomplish no other function. Moreover, the bevel gears 32 and 32a do not rotate about their respective axes but merely revolve about the axes of the bevel gears 14 and 14a.

Thus, the bore drilling rod 27, being held and rotated by the upper chuck 28, is fed downward as it is rotated. Then, when the rack members 8 and 9 reach the limiting positions of their descent and ascent, that is, the spindles 4 and 5 reach the ends of their strokes, the aforementioned lever handle 25 is turned, for example, in the arrow direction indicated in FIG. 2. The bevel gear 20 thereupon is caused, at this instant, to rotate in the direction opposite to that of its former rotation. At this same instant, the bevel gear 21 reverses its rotation and, at the same time, is rotated at a higher speed than formerly. Accordingly, the bevel gears 32 and 32a coupled to this bevel gear begin to rotate about their respective axes, whereby the shaft part 30 retracts to cause the chuck 28 to release the drilling rod 27, while the shaft part 30a advances to cause the chuck 28a to grasp the drilling rod 27.

Then, the gear 10 is rotated in the direction opposite to the arrow direction in FIG. 1, whereupon the rack member 9 descends, and, accordingly, the spindle 5 and the chuck and gear assembly B also descend and return to the position indicated in FIG. 1. During this operation, the drilling rod 27, being supported and rotated by the lower chuck 28a, descends as it rotates. On the other hand, the rack member 8 ascends as the rack member 9 descends, and the support member 6, the spindle 4, and the chuck and gear assembly A accordingly return to the state indicated in FIG. 1.

Just before the device returns to the state indicated in FIG. 1, the lever handle 25 is turned in the direction opposite the arrow direction of FIG. 2, whereupon the chuck 28 grasps the drilling rod 27 similarly as described above, and the chuck 28a releases the rod 27 and returns fully to the initial state.

By continuously repeating the above described operation, the drilling rod 27 is fed downward continuously and smoothly as it is rotated. To raise the drilling rod 27, the operations of the chucks 28 and 28a are reversed.

The handle 25 and the changeover means for changing the rotational direction of the gear 10 may be operated manually at beginning and end of the stroke of the device as observed visually in the above described operation. For this purpose, the changeover means for the gear 10 may be any suitable means of known type such as a reversible clutch drive, a changeover switch (in the case where the gear 10 is motor driven), or a changeover valve device (in the case where the gear 10 is hydraulically driven).

The gear 10 can, of course, be automatically controlled by providing limit switches (in the case of motor drive) or limit valves (in the case of hydraulic drive) at appropriate parts of the device corresponding to the beginning and end of the stroke of either of the rack members 8 and 9 or chuck and gear assemblies A and B. A changeover valve operated by an electromagnet activated in turn by limit switches may be alternatively used in the case of hydraulic drive. It will be obvious that the lever handle 25 can also be automatically operated in accordance with a specific relationship to the operation of the changeover means for the gear 10 through the use of a known device.

Figure 3:
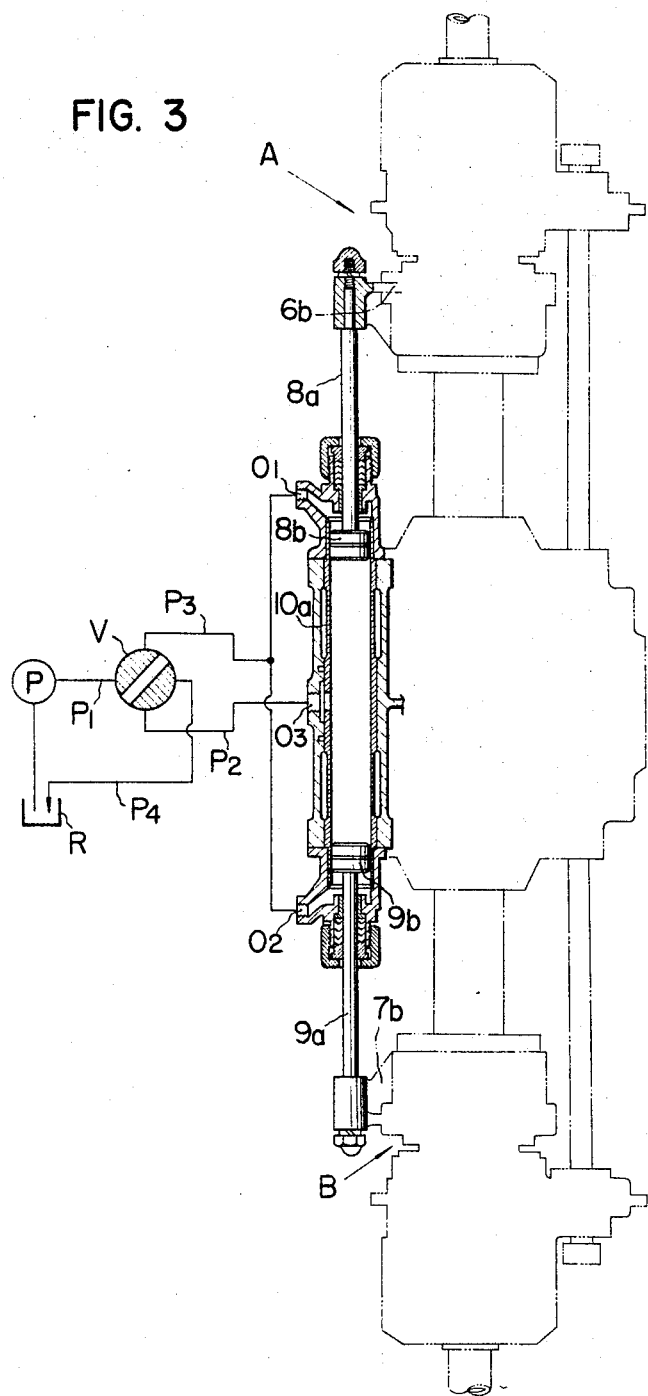
FIG. 3 is an elevational view, partly in vertical section with parts cut away, showing another example of a spindle raising and lowering mechanism for the device shown in FIG. 1.

In another embodiment of the invention as illustrated in FIG. 3, the raising and lowering of the chuck and gear assemblies A and B are accomplished by a hydraulic system instead of rack members 8 and 9 and gear 10. In all other respects this drilling rod feeding device is essentially the same as that described above and as illustrated by FIG. 1.

Referring to FIG. 3, the hydraulic system includes a hydraulic cylinder 10a vertically mounted on the side of the aforementioned structure 50 supporting and housing the bevel gears 1 and 2 and other mechanical parts as shown in FIG. 1. The cylinder 10a is adapted to accommodate two opposed piston 8b and 9b slidable therein in mutually opposite directions. The pistons 8b and 9b are respectively fixed to outwardly (or upwardly and downwardly) extending piston rods 8a and 9a (corresponding functionally to the aforedescribed rack members 8 and 9), which are respectively fixed at their outer ends to support members 6b and 7b (corresponding to support members 6 and 7 in FIG. 1). The hydraulic system further comprises a hydraulic pump P for generating hydraulic pressure, a changeover valve V for changing over paths of pressure application, a reservoir R, and piping connecting the components of the system.

When the hydraulic pump is driven, and the valve V is placed in the position indicated in FIG. 3, hydraulic fluid under pressure produced by the pump P is introduced through pipe lines $P_1$ and $P_3$ and through outer ports $O_1$ and $O_2$ into the cylinder 10a to apply hydraulic pressure on the outer sides of the pistons 8b and 9b. Consequently, the piston rods 8a and 9a move toward each other, and the hydraulic fluid therebetween is forced out through a middle port $O_3$ and through pipe lines $P_2$ and $P_4$ and returns to the reservoir R.

When the valve V is turned through 90 degrees, hydraulic fluid under pressure is introduced through pipe lines $P_1$ and $P_2$ and through the port $O_3$ into the cylinder 10a to apply pressure to the inner sides of the pistons 8b and 9b, whereby the piston rods 8a and 9a are moved apart until they assume their respective positions indicated in FIG. 3, and the fluid on the outer sides of the pistons 8b and 9b is discharged through ports $O_1$ and $O_2$.

Accordingly, the changing over of the operation of the piston rods 8a and 9a, constituting vertical raising and lowering rods, can be accomplished by using the changeover valve V as the aforementioned changeover means.

Figure 4:
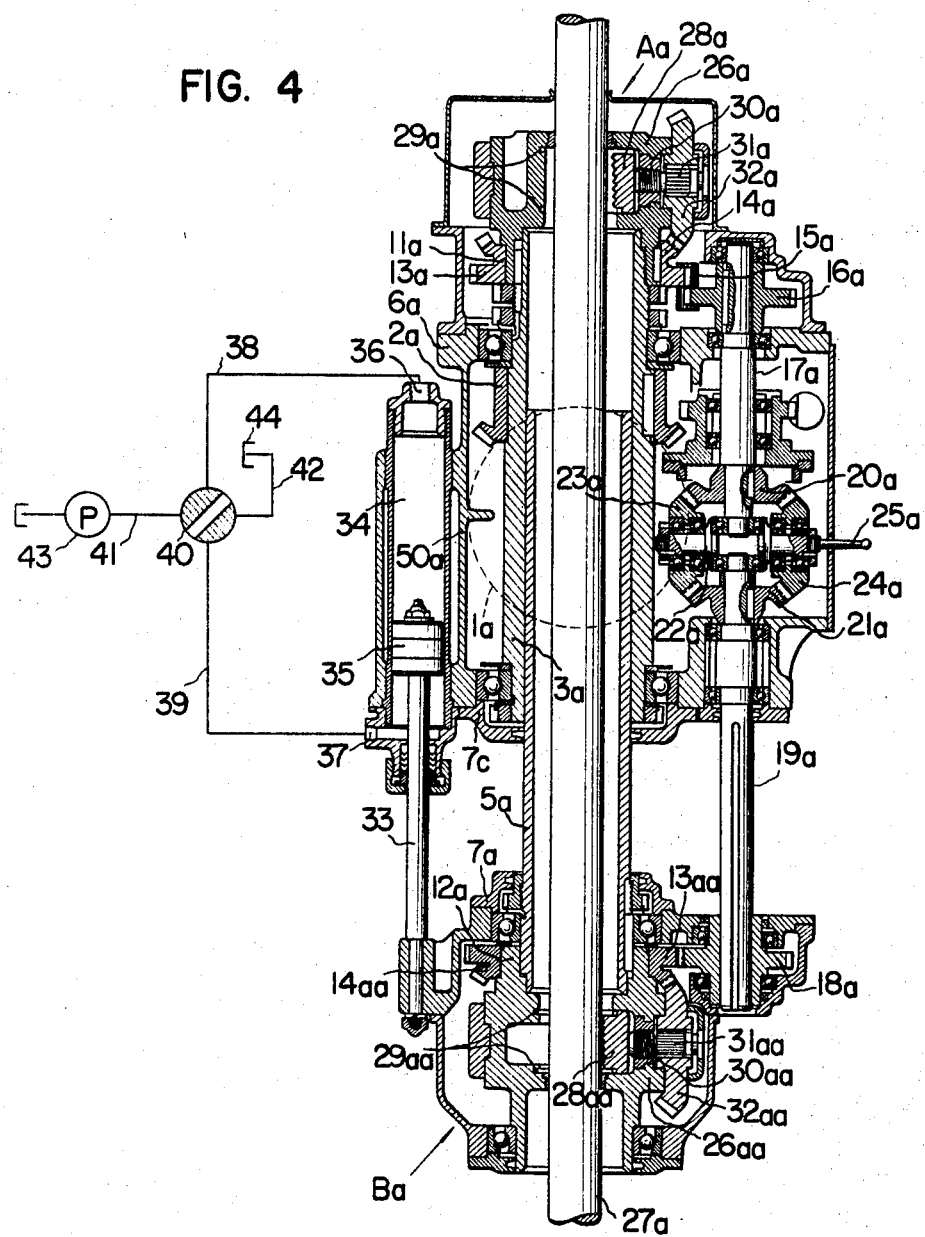
FIG. 4 is an elevational view, in vertical section, showing another embodiment of the invention.

In a further embodiment of the invention as illustrated in FIG. 4, an upper chuck and gear assembly Aa, gear mechanisms corresponding to those enclosed in the aforementioned structure 50, and a hydraulic cylinder with a single piston are arranged as an integral assembly. This assembly and a lower chuck and gear assembly Ba move relative to each other in the axial or vertical direction.

The parts in FIG. 4 which are designated by reference numerals each with one subscript a correspond to the parts in FIG. 1 which are designated by the same reference numerals without subscripts, and the parts in FIG. 4 designated by numerals each with two subscripts aa correspond to the parts in FIG. 1 designated by the same numerals each with a single subscript a. Accordingly, detailed description of these parts will not be repeated herein.

Referring to FIG. 4, the vertical or axial feeding motion is produced by a hydraulic system including a hydraulic cylinder 34 vertically mounted on the side of a structure 50a supporting and housing the bevel gears 1a and 2a and other gears. The cylinder 34 contains a piston 35 slidable therein and is provided with ports 36 and 37 communicating respectively with the upper and lower sides of the piston 35. The piston 35 is fixed to a downwardly extending piston rod 33 fixed at its lower end to a part of a support member 7a fixed to the lower chuck and gear assembly Ba, which can thereby be raised or lowered by the sliding operation of the piston 35.

The hydraulic system further comprises a hydraulic pump 43, a changeover valve 40, a reservoir 44, and pipe lines 38, 39, 41, and 42 connecting the components of the system as shown. When, with the pump 43 in operation, the valve 40 is placed in the position indicated in FIG. 4, the pipe lines 41 and 38 become communicative, and the pipe lines 39 and 42 become communicative, whereupon the piston 35 assumes the position indicated in FIG. 4.

When the valve 40 is turned through 90 degrees from the position shown, the pipe lines 41 and 39 become communicative, and pipe lines 38 and 42 become communicative. Accordingly, the piston 35 and, therefore, the piston rod 33 together with the parts connected thereto are raised, and the hydraulic fluid above the piston 35 is returned to the reservoir 44.

Therefore, by turning the valve 40 through angular control movements of 90 degrees each, it is possible to raise and lower the chuck and gear assembly Ba.

The drilling rod feeding device illustrated in FIG. 4 differs from that shown in FIG. 1 in that the upper chuck and gear assembly Aa is stationary, being fixed integrally to the structure 50a as mentioned hereinbefore, and only the lower chuck and gear assembly Ba is raised and lowered. For this reason, an upper spindle is unnecessary, and the rotating parts within the upper chuck and gear assembly Aa are supported directly on the driving hollow shaft 3a.

The drilling rod feeding device as described above and as illustrated in FIG. 4 operates in the following manner. When, with device in the state indicated in FIG. 4, the bevel gear 1a is driven continuously, the drilling rod 27a, held by the chuck 28aa rotates, similarly as in the case of the rod 27 being rotated through the action of the spindle 4 in FIG. 1. On the other hand, the gears within the upper chuck and gear assembly Aa merely revolve together with the driving hollow shaft 3a, and the chuck 28a is inoperative. One one hand, the vertical shafts 17a and 19a are rotated similarly as shafts 17 and 19 in FIG. 1. Consequently, the bevel gears 20a and 21a rotate.

In the above described operation, the gears 13a and 13aa, bevel gears 16a and 18a, and bevel gears 20a, 21a, 22a, 23a, and 24a merely rotate and do not accomplish any operational function. Furthermore, the bevel gears 32a and 32aa, without rotating about their respective axes, merely revolve around the periphery of the bevel gears 14a and 14aa.

Then, when the lever handle 25a is turned in the direction opposite to that corresponding to the arrow direction in FIG. 2, the bevel gear 20a is instantly rotated in the same direction at a higher speed, and the bevel gear 21a is rotated in the direction opposite to the former direction. Accordingly, the bevel gears 32a and 32aa coupled with these bevel gears begin to rotate about their respective axes, whereby the shaft part 30a advances to cause the chuck 28a to grasp the drilling rod 27a and the shaft part 30aa retracts to permit the chuck 28aa to release the rod 27a.

Then, when the changeover valve 40 is turned through 90 degrees to supply pressurized fluid into the port 37 and to permit discharge of fluid from the port 36, the piston 35 and, therefore, the piston rod 33 ascend, whereby the chuck and gear assembly Ba and the spindle 5a ascend relative to the drilling rod 27a.

When these parts reach the end of their upward stroke, the lever handle 25a is moved in the reverse direction, whereupon the bevel gears 20a and 21a are retarded or advanced in speed with a relationship which is opposite that existing formerly, and the bevel gears 32a and 32aa begin to rotate about their respective axes in directions reverse to their former rotation directions. As a result, the shaft part 30a retracts to cause the chuck 28a to release the drilling rod 27a, while the shaft part 30aa advances to cause the chuck 28aa to grasp the rod 27a.

Immediately thereafter, the changeover valve 40 is turned through 90 degrees, whereupon pressurized hydraulic fluid is introduced into the cylinder 34 through the port 36, and hydraulic fluid is discharged through the port 37, whereby the piston rod 33 descends. Accordingly, the chuck and gear assembly Ba and the spindle 5a descend, and, simultaneously, the drilling rod 27a is fed downward as it is rotated.

Then, when the device again assumes the state indicated in FIG. 4, the above described operation is repeated. Thus, the drilling rod 27a can be propelled successively and continuously as it is rotated.

As described above, the present invention provides a device for feeding bore drilling rods wherein, when a first chuck which is propelling a drilling rod is caused to release the rod, a second chuck operates to hold the rod temporarily, after which the chuck feeds the rod continuously. Therefore, it is possible to prevent damage to the drilling bit due to the weight of the drilling rod without the installation of a separate holder.

Furthermore, since the changing over of the operation from one chuck to the other can be accomplished by a simple manipulation of a lever handle to operate a differential gear device, the entire feeding device is of relative simple construction, and, moreover, non-stop propulsion of the drilling rod can be effectively accomplished.

It should be understood, of course, that the foregoing disclosure relates to only preferred embodiments of the invention and that it is intended to cover all changes

What I claim is:

1. In a bore drilling machine of the type wherein a chuck grasps and propels a drilling rod with rotation through one stroke, releases the rod at the end of this stroke, retracts to the original position, and again grasps and propels the rod with rotation through a succeeding stroke, a device for continuously feeding the drilling rod with rotation comprising: two chucks provided at respectively different positions; chuck driving mechanisms for respectively causing the two chucks to advance and retract with respect to the drilling rod in the axial direction thereof with rotation; gear mechanisms for respectively driving the chuck driving mechanisms; two rotatable shafts respectively driven by said gear mechanisms; a differential gear mechanism coupled between the two rotatable shafts; and changeover means to temporarily impart positive or negative differential rotation to the differential gear mechanism and thereby to cause one of the chucks to release the rod and retract and the other of the chucks to grasp the rod and advance.

2. The drilling rod feeding device as claimed in claim 1 in which the two chucks are fed and caused to advance and retract in the drilling rod axial direction by a controllably power driven gear and rack members meshed with said gear on opposite sides thereof and fixed respectively to the two chucks.

3. The drilling rod feeding device as claimed in claim 1 in which the two chucks are fed hydraulically and caused to advance and retract in the drilling rod axial direction by coaxial piston rods respectively fixed at their outer ends to the two chucks and at their inner ends to two opposed hydraulic pistons operating within a single hydraulic cylinder fixed relative to the bore drilling machine and constituting the motor component of a controllable hydraulic system.

4. The drilling rod feeding device as claimed in claim 1 in which the changeover means is manually operated.

5. The drilling rod feeding device as claimed in claim 1 in which the changeover means is automatically operated in accordance with the mechanical state of the device.

6. A device for continuously feeding and rotating a drilling rod of a bore drilling machine, said device comprising: upper and lower chuck devices for respectively grasping a drilling rod at upper and lower parts thereof; means to cause the chuck devices to accomplish the operation of grasping the drilling rod with one, for example, a first chuck device, of the chuck devices and advancing said rod axially with rotation, at the same time, causing the other second chuck device to retract through a stroke, causing the first chuck device to release the rod at the end of this stroke, grasping the rod with the second chuck device and advancing the rod axially with rotation, and causing the second chuck device to reelase the rod at the end of this stroke; rotatable shafts having mutually confronting ends and respectively rotating together with the two chuck devices; a differential gear mechanism coupled between said confronting ends of the rotatable shafts; and auxiliary control means to change over the operation of the differential gear mechanism to cause the chuck devices to undergo alternately repetitions of said operation and thereby to accomplish continuous feeding of the rod with rotation.

7. The drilling rod feeding device as claimed in claim 6 in which one of the two chuck devices is stationary and the other chuck device is fed hydraulically and caused to undergo reciprocation in the drilling rod axial direction by a piston rod fixed at its one end to the said other chuck and at its other end to a hydraulic piston operating within a hydraulic cylinder fixed relative to the said one chuck device and constituting the motor component of a controllable hydraulic system.

References Cited

UNITED STATES PATENTS

| | | | |
|---|---|---|---|
| 462,393 | 11/1891 | Bullock | 173—149 X |
| 2,570,308 | 10/1951 | Beeth | 173—149 |
| 2,638,324 | 5/1953 | Ball | 173—149 |
| 2,730,331 | 1/1956 | Harinck | 173—149 |
| 2,829,865 | 4/1958 | Wagner | 173—149 |
| 3,131,776 | 5/1964 | Kvello-Aune | 173—149 |

NILE C. BYERS, JR., *Primary Examiner.*